2,841,529

PROCESS FOR MANUFACTURING CELLULOSE WOOL AND RESULTING PRODUCTS THEREOF

Jacques Schmidt and Pierre-François Auguste Meyer, Strasbourg-Robertsau, France, assignors to Société dite: Papeteries de la Robertsau, Société Anonyme, Strasbourg-Robertsau, France, a French company No Drawing. Application February 10, 1953
Serial No. 336,208

Claims priority, application France August 29, 1952

10 Claims. (Cl. 167—84)

The uses to which cellulose wool is put today are very numerous among which should be mentioned its application as sanitary or medicinal cellulose wool. In this connection it is often used as an absorbent material of liquids, and among such liquids there are some which are odoriferous; then, these liquids make this product a carrier for odorous substances.

For some time now, producing cellulose wool with an absorbtion power of odors given off by liquids it is intended to absorb would fulfill a long-felt desire, but such a product has not yet been embodied. With the object in view to obtain such a result, it has been proposed to incorporate with cellulose wool various substances such as chlorophyll, natural or synthetic essential oils, aldehydes, their polymers, silica gels and alumina gels, porous bodies and the like.

However, simply to impregnate cellulose wool articles with one or several of these substances is not a satisfactory solution to obtain the desired result.

The present invention has for its object a process whereby cellulose wool is really capable of absorbing said odors in such a quantity that under conditions of use of this wool, these odors cannot be perceptible to the smell.

Contrary to known processes, according to the present invention, it is during the course of its making that the cellulose wool is made inhibitory of the odors.

With this purpose in view, to the aqueous bath of cellulose material intended for the manufacture of the cellulose wool, there is added the necessary chlorophyll to the cellulose wool to make it inhibitory of the odors, then this chlorophyll is fixed by flocculation on said cellulose material after which the latter undergoes the usual subsequent treatment for producing cellulose wool.

Fixing this chlorophyll by flocculation on cellulose material is obtained by adding a soluble salt of a polyvalent metal to the aqueous bath containing this material.

As soluble salts thus used there should be mentioned aluminum sulphate, alum, soluble salts of barium and the like.

According to a species of embodiment of the process, the object of the invention, before adding soluble salts of a polyvalent metal, an amylaceous product is added to the aqueous body in treatment. This addition strengthens the fixing power of the chlorophyll on the cellulose, so that this use of an amylaceous product permits reducing the quantity of chlorophyll to be added to the cellulose pulp or paste for obtaining a given deodorizing power of the cellulose wool which is finally produced.

After these various operations are ended, with the cellulose body resulting from these treatments, the usual manner for making cellulose wool is carried out. This gives a cellulose wool which is chlorophyllized and inhibitory of the odors.

The present invention relates to:

(1) The process of manufacturing cellulose wool containing chlorophyll as shown above;

(2) In so far as a new product, cellulose wool containing chlorophyll obtained by this process;

(3) Among the different applications which can be made of this cellulose wool containing chlorophyll, there should be mentioned those relating to sanitary uses;

(4) In so far as there are new products, cellulose wool articles containing chlorophyll made with a view to such uses. Among the articles thus made with a view to the uses of cellulose wool, the following should be mentioned merely by way of examples: Sanitary towels, arm-protectors, dressings, swaddling-clothes, insoles for shoes, etc.

It should be pointed out that not only are the products made of cellulose wool containing chlorophyll inhibitory of the odors, but, at the same time, they have other advantages owing to the other properties of the chlorophyll. The term "chlorophyll" as used herein means "deodorizing chlorophyll."

By way of example, and merely on this account, a concrete example of making cellulose wool containing chlorophyll inhibitory of the odors will be given below.

In a wash-tub or a trough, 5,500 liters of water are first of all placed therein, then the following cellulose materials:

|  | Kgs. |
| --- | --- |
| Bleached sulphite pulp (delivered by the firm Kornsnass Roburwite) | 125 |
| Soft pine (wet) | 40 |
| Cold wood pulp (delivered by the firm Horteur) (wet) | 135 |
| Broke IV/3 | 30 |

Broke IV/3 is wadding waste (the word "broke" is a translation of the French "les cassés"). The numerals "IV/3" designate the respective quantities of Kornsnass Roburwite (bleached sulphite cellulosic pulp), soft pine (wet) (unbleached bisulphite) and Horteur wet (mechanical cellulosic pulp, i. e., ground without chemical treatment). Broke IV/3 contains the same proportions of the three above mentioned pulps in the respective amounts of: 125, 40 and 135 parts by weight.

These materials are then triturated and crushed in this water during 60 minutes or about that length of time, after which the chlorophyll is put in said mixture in the proportion of 0.8% of the cellulose materials loaded therein and, after a new mixing of about 10 minutes, the amylaceous substance, in the proportion of 4% of the same cellulose materials is loaded therein.

Lastly, after another mixing of about 15 minutes, a quantity of aluminum sulphate equal to about 3.2% of the amount of cellulose is added to the mixture.

After mixing of the wool during for approximately ten minutes, the substance produced is directed on to the cellulose wool machine and transformed into cellulose wool.

On the cellulose wool thus produced almost the whole of the chlorophyll which has been put into the trough during course of manufacture is fixed.

We declare that what we claim is:

1. A process for manufacturing a cellulose wool product inhibited against evolution of odors of liquids absorbed therein, which comprises: preparing an aqueous suspension of cellulosic fibers, thoroughly distributing deodorizing chlorophyll in said suspension, adding thereto a water-soluble salt of a metal selected from the group consisting of aluminum and barium to act as a flocculant for the said chlorophyll on the cellulose, and converting the suspension into cellulose wool.

2. The process of claim 1 in which the water-soluble salt is aluminum sulphate.

3. The process of claim 1 in which the water-soluble salt is alum.

4. The process of claim 1 in which the water-soluble salt is a barium salt.

5. A cellulose wool product inhibited against the evolution of odors of liquids absorbed thereon which comprises: cellulose wool made in accordance with the process of claim 1.

6. A cellulose wool product inhibited against the evolution of odors of liquids absorbed thereon which comprises: cellulose wool made in accordance with the process of claim 1, wherein the water-soluble salt is aluminum sulphate.

7. A cellulose wool product inhibited against the evolution of odors of liquids absorbed thereon which comprises: cellulose wool made in accordance with the process of claim 1 wherein the water-soluble salt is alum.

8. A cellulose wool product inhibited against the evolution of odors of liquids absorbed thereon which comprises: cellulose wool made in accordance with the process of claim 1 wherein the water-soluble salt is a barium salt.

9. A process for manufacturing a cellulose wool product inhibited against the evolution of odors of liquid absorbed thereon, which comprises: preparing an aqueous suspension of cellulosic fibers, adding to said suspension an amylaceous substance, thoroughly distributing deodorizing chlorophyll in said suspension in an amount sufficient to inhibit said odor evolution, adding thereto a water-soluble salt of a metal selected from the group consisting of aluminum and barium to act as a flocculant for the said chlorophyll on the cellulose, and converting the suspension into cellulose wool.

10. A cellulose wool product inhibited against the evolution of odors of liquids absorbed thereon which comprises: cellulose wool made in accordance with the process of claim 9.

References Cited in the file of this patent

UNITED STATES PATENTS

| | | |
|---|---|---|
| 564,928 | Hirschler | July 28, 1896 |
| 2,024,145 | Cline | Dec. 17, 1935 |
| 2,120,667 | Gruskin | June 14, 1938 |
| 2,371,390 | Graue | Mar. 13, 1945 |
| 2,542,909 | De Wet | Feb. 20, 1951 |

FOREIGN PATENTS

| | | |
|---|---|---|
| 146,967 | Austria | Sept. 10, 1936 |

OTHER REFERENCES

Jour. Med. Soc., N. J., July 1951, vol. 48, No. 7, p. 321.
Chem. and Eng. News, September 1, 1952, p. 3626.
Chem. Zentr., July and August 1941, II, 776–7.